(12) United States Patent
Lee et al.

(10) Patent No.: US 11,137,653 B2
(45) Date of Patent: Oct. 5, 2021

(54) DISPLAY DEVICE AND METHOD OF FABRICATING THE SAME

(71) Applicant: Samsung Display Co., LTD., Yongin-si (KR)

(72) Inventors: Kang Young Lee, Seongnam-si (KR); Yong Seok Kim, Seoul (KR); Dong Chul Shin, Hwaseong-si (KR); Hyun Sup Lee, Seoul (KR); Gye Hwan Lim, Incheon (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/827,061

(22) Filed: Mar. 23, 2020

(65) Prior Publication Data

US 2020/0401006 A1 Dec. 24, 2020

(30) Foreign Application Priority Data

Jun. 21, 2019 (KR) .......................... 10-2019-0074308

(51) Int. Cl.
*G02F 1/1362* (2006.01)
(52) U.S. Cl.
CPC .. *G02F 1/136286* (2013.01); *G02F 1/136227* (2013.01); *G02F 1/136222* (2021.01); *G02F 2201/123* (2013.01)
(58) Field of Classification Search
None
See application file for complete search history.

(56) References Cited

U.S. PATENT DOCUMENTS

2018/0314118 A1* 11/2018 Itou .................... G02F 1/136286
2020/0073163 A1* 3/2020 Kawata ................ G02F 1/1368

FOREIGN PATENT DOCUMENTS

| KR | 10-2004-0064466 | 7/2004 |
| KR | 10-2007-0121162 | 12/2007 |
| KR | 10-2008-0062171 | 7/2008 |
| KR | 10-2015-0033444 | 4/2015 |
| KR | 10-2017-0110217 | 10/2017 |

OTHER PUBLICATIONS

Hyung Sup Lee et al., "Large-area Ultra-high Density 5.36" 10Kx6K 2250 ppi Display", SID 2018 DIGEST, pp. 607-609.

* cited by examiner

*Primary Examiner* — James A Dudek
(74) *Attorney, Agent, or Firm* — Kile Park Reed & Houtteman PLLC

(57) ABSTRACT

A display device includes a base, a semiconductor layer on the base and including source, drain and channel regions, a first insulating layer on the semiconductor layer, a gate line on the first insulating layer and overlapping the channel region, a second insulating layer on the gate line, a data line on the second insulating layer, a third insulating layer on the data line, a drain electrode disposed on the third insulating layer and in contact with the drain region through a contact hole in the first, second and third insulating layers, a first protective electrode on the drain electrode to overlap the drain electrode, a fourth insulating layer on the third insulating layer where the first protective electrode is formed, and a pixel electrode on the fourth insulating layer and in contact with the first protective electrode through a contact hole in the fourth insulating layer.

22 Claims, 20 Drawing Sheets

DISPLAY DEVICE AND METHOD OF FABRICATING THE SAME

CROSS-REFERENCE TO RELATED APPLICATION

This application claims priority to and benefits of Korean Patent Application No. 10-2019-0074308 under 35 U.S.C. § 119, filed in the Korean Intellectual Property Office on Jun. 21, 2019, the entire contents of which are incorporated herein by reference.

BACKGROUND

1. Field of the Disclosure

The disclosure relates to a display device, and a method for manufacturing the display device.

2. Description of the Related Art

The importance of display devices continues to increase as a result of the evolution of multimedia technology. Accordingly, a variety of types of display devices, for example, liquid-crystal display (LCD) devices and organic light-emitting display (OLED) devices are currently in use.

Among display devices, an LCD device is one of the most widely used flat panel display devices. An LCD device is composed of two substrates on which electrodes such as pixel electrodes and common electrodes are formed for generating an electric field, and a liquid-crystal layer is interposed between the two substrates. A voltage is applied to the electrodes to form an electric field in the liquid-crystal layer, such that the orientation of the liquid crystals molecules contained in the liquid-crystal layer is altered and the polarization of incident light is controlled in order to display images.

Recently, as the resolution of liquid-crystal displays increases, the physical distances between a variety of signal lines tend to be closer. Different signal lines may be disposed in different layers with an insulating layer interposed therebetween to prevent physical and electrical interference between them. The signal lines may be connected to the lines disposed in different layers through contact holes.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide a display device that improves image quality by way of forming a protective layer on a signal line, and for example, forming a protective electrode over a drain electrode.

However, aspects of the disclosure are not restricted to the one set forth herein. The above and other aspects of the disclosure will become more apparent to one of ordinary skill in the art to which the t disclosure pertains by referencing the detailed description of the disclosure given below.

According to one or more embodiments, a display device comprises: a base, a semiconductor layer disposed on the base and comprising a source region, a drain region and a channel region, a first insulating layer disposed on the semiconductor layer, a gate line disposed on the first insulating layer, in a first direction and overlapping the channel region, a second insulating layer disposed on the gate line, a data line disposed on the second insulating layer, in a second direction intersecting the first direction, and in contact with a portion of the source region, a third insulating layer disposed on the data line, a drain electrode disposed on the third insulating layer and in contact with the drain region through a contact hole formed in the first insulating layer, the second insulating layer and the third insulating layer, a first protective electrode disposed on the drain electrode to overlap the drain electrode, a fourth insulating layer disposed on the third insulating layer where the first protective electrode is formed, and a pixel electrode disposed on the fourth insulating layer and in contact with the first protective electrode through a contact hole formed in the fourth insulating layer.

The first protective electrode may be made of a same material as the pixel electrode.

The first protective electrode may be made of a transparent conductive material comprising at least one of indium tin oxide (ITO), indium zinc oxide (IZO), indium tin zinc oxide (ITZO) and aluminum zinc oxide (AZO).

The first protective electrode may be in physical contact with the pixel electrode, and the drain electrode may be in electrical contact with the pixel electrode.

The first protective electrode may be in electrical contact with the pixel electrode, and the drain electrode may be in electrical contact with the pixel electrode.

The drain electrode may comprise triple layers of a Ti/Al/Ti in which titanium is stacked on and under aluminum.

The drain electrode and the first protective electrode may not overlap the data line in a third direction intersecting the first direction and the second direction.

The data line may be in contact with the source region through another contact hole formed in the first insulating layer and the second insulating layer.

The display device may further comprise a color filter layer disposed on the third insulating layer where the drain electrode and the first protective electrode are formed and not overlapping with the first contact hole, the pixel electrode may be disposed on the color filter layer.

The display device may further comprise a second protective electrode disposed between the fourth insulating layer and the pixel electrode, the second protective electrode may be extended from an end of the color filter to a portion of the contact hole adjacent to the end of the color filter.

The second protective electrode may be made of a same material as the first protective electrode.

The display device may further comprise an organic layer disposed on the third insulating layer and the pixel electrode.

An upper surface of the organic layer may be substantially coplanar with an upper surface of the pixel electrode.

The gate line may extend in the first direction and may be bent in at least one direction to bypass the first protective electrode on a plane.

The gate line may include a first portion substantially in parallel with a first direction, a second portion substantially in parallel with the first direction and spaced apart from the first portion, and a third portion connecting the first portion with a second portion.

The display device may further comprise a light-blocking layer disposed on the base and overlapping the semiconductor layer, and a buffer layer disposed on the light-blocking layer, wherein the semiconductor layer is disposed on the buffer layer.

The base may comprise a light-blocking area in which the light-blocking layer is disposed, and a light-transmitting area in which the light-blocking layer is not disposed.

According to one or more embodiments, a method of fabricating a display device comprises: forming a semiconductor layer comprising a source region, a drain region and a channel region on a base, forming a first insulating layer on the semiconductor layer, forming a gate line on the first insulating layer in a first direction, the gate line overlapping the channel region, forming a second insulating layer on the gate line, forming a data line on the second insulating layer in a second direction intersecting the first direction, the data line and in contact with a portion of the source region, forming a third insulating layer on the data line, forming a contact hole in the first insulating layer, the second insulating layer and the third insulating layer to expose the drain region, forming a drain electrode on the third insulating layer, the drain electrode contacting the drain region exposed through the contact hole, forming a first protective electrode on the drain electrode to overlap the drain electrode, forming a fourth insulating layer on the third insulating layer where the first protective electrode is formed, forming a contact hole in the fourth insulating layer to expose the first protective electrode, and forming a pixel electrode on the fourth insulating layer, the pixel electrode being in contact with the first protective electrode exposed through the contact hole.

The first protective electrode may be formed in a same photolithography process as the drain electrode.

The first protective electrode may be formed by wet etching, and the drain electrode may be formed by dry etching.

The method of fabricating a display device may further comprise forming a color filter layer not overlapping the contact hole in the first insulating layer, the second insulating layer and the third insulating layer, on the third insulating layer where the drain electrode and the first protective electrode are formed, the pixel electrode may be disposed on the color filter.

The method of fabricating a display device may further comprise forming a second protective electrode between the fourth insulating layer and the pixel electrode, wherein the second protective electrode may be disposed between an end of the color filter and the contact hole formed in the fourth insulating layer adjacent to the end of the color filter.

According to an embodiment of the disclosure, the image quality of a display device may be improved by way of forming a protective layer on a signal line.

It should be noted that effects of the disclosure are not limited to those described above and other effects of the disclosure will be apparent to those skilled in the art from the following descriptions.

BRIEF DESCRIPTION OF THE DRAWINGS

An additional appreciation according to the embodiments will become more apparent by describing in detail the embodiments thereof with reference to the accompanying drawings, wherein.

DETAILED DESCRIPTION OF THE EMBODIMENTS

Figure 1:
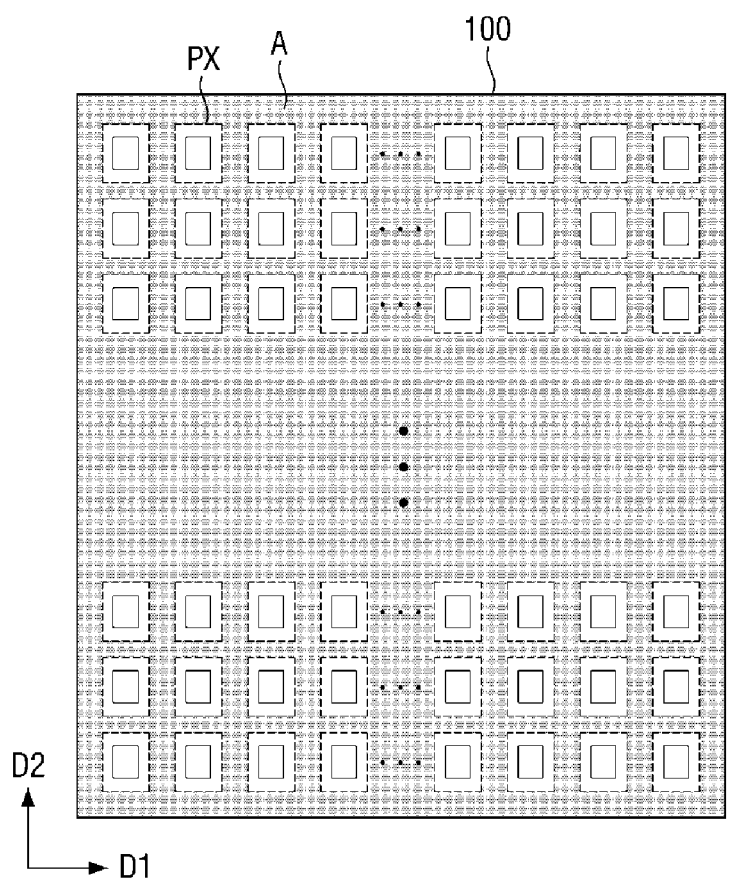
FIG. 1 is a plan view schematically showing the layout of pixel areas and area A of a display device.

In the following description, for the purposes of explanation, numerous details are set forth in order to provide a thorough understanding of various embodiments or implementations. As used herein "embodiments" and "implementations" are interchangeable words that are non-limiting examples of devices or methods employing one or more of the inventive concepts disclosed herein. It is apparent, however, that various embodiments may be practiced without these noted details or with one or more equivalent arrangements. In other instances, well-known structures and devices may be shown in block diagram form in order to avoid unnecessarily obscuring various embodiments. Various embodiments may be different, but do not have to be exclusive. For example, shapes, configurations, and characteristics of an embodiment may be used or implemented in another embodiment without departing from the inventive concepts and the spirit and scope of the invention.

Unless otherwise specified, the illustrated embodiments are to be understood as providing features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts and the spirit and scope of the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing various embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the spirit and scope of the inventive concepts. Further, the blocks, units, and/or modules of some embodiments may be physically combined into more complex blocks, units, and/or modules without departing from the spirit and scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
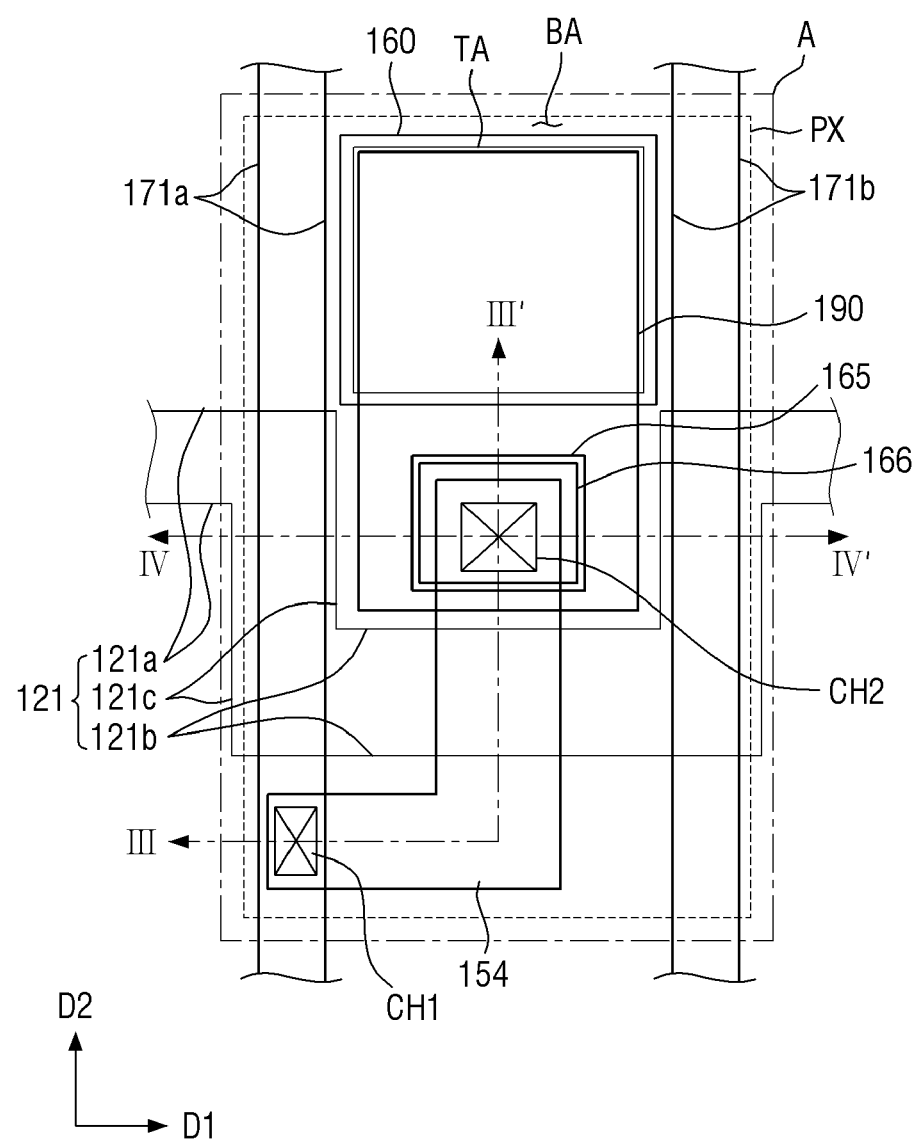
FIG. 2 is a plan view of a single pixel of a display device according to an embodiment of the disclosure.
Figure 3:
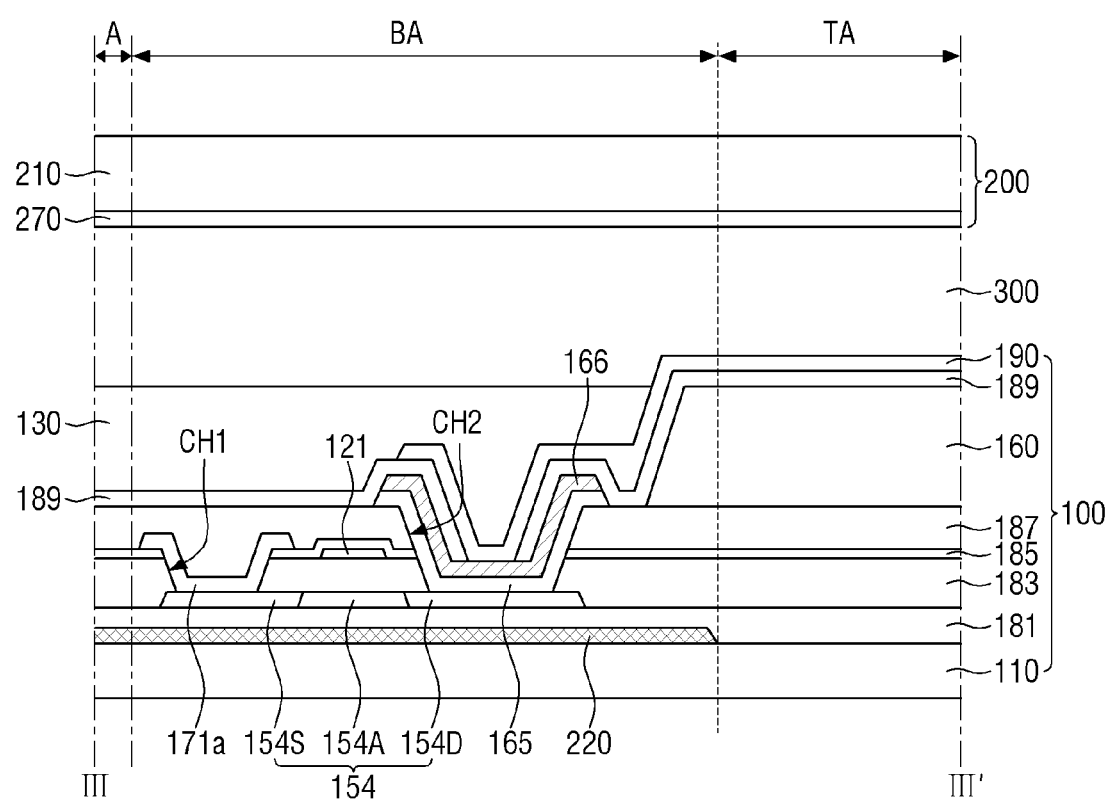
FIG. 3 is a schematic cross-sectional view of the display device according to the embodiment shown in FIG. 2, taken along line III-III'.
Figure 4A:
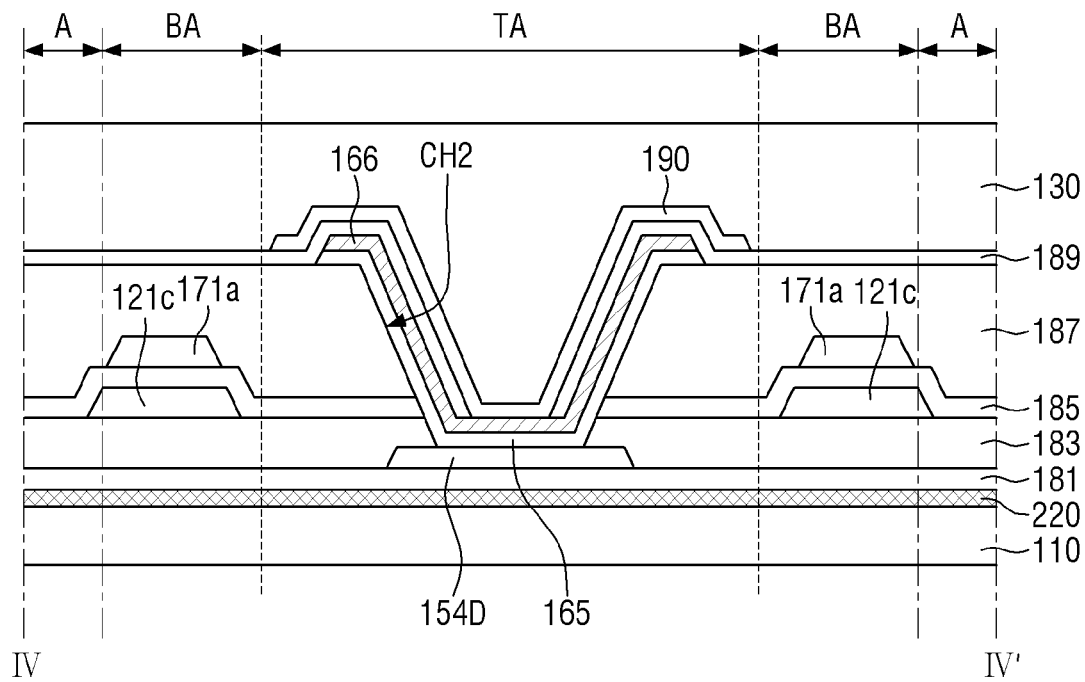
FIG. 4A is a schematic cross-sectional view of the display device according to the embodiment shown in FIG. 2, taken along line IV-IV'.

FIG. 1 is a plan view schematically showing the layout of pixel areas and area A of a display device. FIG. 2 is a plan view of a single pixel of a display device according to an embodiment of the disclosure. FIG. 3 is a schematic cross-sectional view of the display device shown in FIG. 2, taken along line III-III'. FIG. 4A is a schematic cross-sectional view taken along line IV-IV' of FIG. 2.

Referring to FIGS. 1 to 4A, the display device 1 according to the embodiment of the disclosure may include a first display substrate 100, a second display substrate 200 facing the first display substrate 100, and a liquid-crystal layer 300 interposed between the first display substrate 100 and the second display substrate 200. Although not illustrated, the display device 1 may include a polarization unit. The polarization unit may be implemented as a separate element from the first display substrate 100 or the second display substrate 200. The display device 1 according to the embodiment of the disclosure may include a backlight unit positioned under the first display substrate 100. However, the display device 1 is not limited to the liquid-crystal display device and may be, for example, an organic light-emitting display device.

The first display substrate 100 includes pixel areas PX and area A where an organic layer 130 may be disposed. The organic layer 130 will be described later in detail. A part of each of the pixel areas PX may overlap with area A. The other part of each of the pixel areas PX that does not overlap area A may include a light-transmitting area TA through which light passes. The term overlap may include layer, stack, face or facing, extending over, covering or partly covering or any other suitable term as would be appreciated and understood by those of ordinary skill in the art. The terms 'do not overlap' may include 'apart from' or 'set aside from' or 'offset from' and any other suitable equivalents as would be appreciated and understood by those of ordinary skill in the art.

The first display substrate 100 may be an array substrate on which elements for driving liquid-crystal molecules in the liquid-crystal layer 300, e.g., a switching element such as a thin-film transistor, may be formed.

The second display substrate 200 may be a substrate facing the first display substrate 100, for example, the opposing substrate.

Hereinafter, the first display substrate 100 will be described.

A first base 110 may be an insulating substrate, and the insulating substrate may be transparent. For example, the first base 110 may be a glass substrate, a quartz substrate, a transparent resin substrate, etc., or any other suitable material. The first base 110 may include a polymer or plastic that is highly resistant to heat. In some embodiments, the first base 110 may have flexibility. For example, the first base 110 may be deformable so that it can be rolled, folded, bent and so on.

For example, the flexible, transparent insulating material may include polyimide (PI) resin, polyetherimide (PEI) resin, polyethylene terephthalate (PET) resin, polycarbonate (PC) resin, polymethylmethacrylate (PMMA) resin, polystyrene (PS) resin, styrene-acrylonitrile copolymer (SAN) resin, silicon-acryl resin.

The first base 110 may include a light-transmitting area TA and a light-blocking area BA. In the light-transmitting area TA, the light provided from a backlight unit (not shown) located or disposed under the first base 110 may transmit to display images. In the light-blocking area BA, the light provided from the backlight unit may be blocked.

A light-blocking layer 220 may be disposed on the first base 110. The light-blocking layer 220 may block or absorb light introduced from the outside and may overlap the light-blocking area BA of the first base 110.

The light-blocking layer 220 may be made of an opaque metal, e.g., a metal that absorbs light or an alloy thereof, and may have a black-based color. For example, the light-blocking layer 220 may be one of molybdenum (Mo), chromium (Cr), titanium (Ti), niobium (Nb), manganese (Mn) and tantalum (Ta), or an alloy thereof. It is, however, to be understood that embodiments of the disclosure are not limited thereto. Any metal that can absorb light may be employed as the light-blocking layer 220.

A buffer layer 181 covering the light-blocking layer 220 may be disposed on the first base 110. The buffer layer 181 may prevent the permeation of impurity elements and may provide a flat surface. It may be formed of any of a variety of materials as long as it can achieve the aforementioned effects. For example, the buffer layer 181 may be made of at least one selected from the group consisting of silicon nitride (SiNx), silicon oxide (SiO$_2$), and silicon oxynitride (SiOxNy).

A semiconductor layer 154 may be disposed on the buffer layer 181. The semiconductor layer 154 may overlap the light-blocking layer 220 and accordingly the light-blocking layer 220 may block light introduced into the semiconductor layer 154 and may prevent leakage current due to the light otherwise introduced into the semiconductor layer 154. The semiconductor layer 154 may be made of a semiconductor material which is at least one selected from the group consisting of: polycrystalline silicon, amorphous silicon and an oxide semiconductor. The semiconductor layer 154 includes a channel region 154A which is not doped with impurities, and a source region 154S and a drain region 154D formed by doping impurities on both sides of the channel region 154A. Impurities may be n-type impurities or p-type impurities and may vary depending on the type of thin-film transistors.

A first insulating layer 183 covering the semiconductor layer 154 may be disposed on the semiconductor layer 154. The first insulating layer 183 may be used to insulate the semiconductor layer 154 from a gate line 121 to be described later. The first insulating layer 183 may include an inorganic material such as silicon nitride (SiNx), silicon oxide (SiO$_2$), silicon oxynitride (SiOxNy) and tetra ethyl ortho silicate (TEOS) and may be made up of a single layer or multiple layers.

The gate line 121 may be disposed on the first insulating layer 183 as shown in FIG. 3. The gate line 121 transmits a gate signal and may be extended generally in a direction. In the following description, the gate line 121 may be extended in the horizontal direction or the first direction D1 for convenience of illustration. As used herein, the expression that the gate line 121 is extended in the first direction D1 encompasses that the gate line 121 may be entirely in parallel with the first direction D1 as well as that the gate line 121 has directivity and may be extended generally in parallel with the first direction D1 even though some portions thereof are not in parallel with the first direction D1. A gate electrode may protrude from the gate line 121 and may be connected to the gate line 121. In some embodiments, the gate line 121 may include an aluminum-based metal such as aluminum (Al) and an aluminum alloy, a silver-based metal such as silver (Ag) and a silver alloy, a copper-based metal such as copper (Cu) and a copper alloy, a molybdenum-based metal such as molybdenum (Mo) and an molybdenum alloy, chromium (Cr), tantalum (Ta), titanium (Ti), etc.

The gate line 121 may be extended in the first direction D1 and may be bent in at least one direction on a plane. The gate line 121 may include a first portion 121a extended substantially in parallel with the first direction D1, a second portion 121b extended substantially in parallel with the first direction D1 and is spaced apart from the first portion 121a, and a third portion 121c connecting the first portion 121a with the second portion 121b. For example, the first portion 121a of the gate line 121 may be extended in the first direction D1, the second portion 121b may be bent from the first portion 121a or the third portion 121c to be extended in the second direction D2, and the third portion 121c may be bent from the second portion 121b to be extended in the first direction D1. Therefore, the gate line 121 may be extended in the first direction D1, may bypass the first protective electrode 166, the drain electrode 165, or the second contact hole CH2 on a plane. In some embodiments, the second portion 121*b* may overlap a first data line 171*a* or a second data line 171*b* which will be described later.

The gate line 121 may be extended in the first direction D1 and overlap the channel region 154A of the semiconductor layer 154. Although the third portion 121*c* of the gate line 121 overlaps the channel region 154A of the semiconductor layer 154 in the drawings, the disclosure is not limited thereto. The first portion 121*a* may overlap the channel region 154A of the semiconductor layer 154. The portion of the gate line 121 overlapping the channel region 154A of the semiconductor layer 154 may serve as the gate electrode of the thin-film transistor, which will be described later.

A second insulating layer 185 may be disposed on the gate line 121. The second insulating layer 185 may be made of an insulating material. For example, the insulating material may be an inorganic material such as silicon nitride (SiNx), silicon oxide ($SiO_2$) and silicon oxynitride (SiOxNy).

A first contact hole CH1 exposing the source region 154S of the semiconductor layer 154 may be formed in the first insulating layer 183 and the second insulating layer 185.

The first data line 171*a* and the second data line 171*b* extended along the second direction D2 crossing the gate line 121 may be disposed on the second insulating layer 185. A data voltage may be applied to the first data line 171*a* and the second data line 171*b*.

The first data line 171*a* may be formed by stacking two or more different types of metal layers having different electron mobilities. For example, the first data line 171*a* may be formed by stacking two or more metal layers selected from the group consisting of: aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), copper (Cu), and an alloy thereof.

At least a part of the first data line 171*a* may be in direct contact with and electrically connected to the source region 154S of the semiconductor layer 154 exposed via the first contact hole CH1. The first data line 171*a* in contact with the source region 154S may serve as the source electrode of the thin-film transistor.

A third insulating layer 187 may be disposed on the first data line 171*a*, the second data line 171*b*, and the second insulating layer 185. The third insulating layer 187 may be made of an insulating material. For example, the insulating material may be an inorganic material such as silicon nitride (SiNx), silicon oxide ($SiO_2$) and silicon oxynitride (SiOxNy).

As shown in FIG. 3, a second contact hole CH2 exposing the drain region 154D of the semiconductor layer 154 may be formed in the first insulating layer 183, the second insulating layer 185, and the third insulating layer 187. When viewed from the top, the gate line 121 may be located or disposed substantially between the first contact hole CH1 and the second contact hole CH2, and the first contact hole CH1 may be spaced apart from the second contact hole CH2 in a second direction D2 crossing the first direction D1, with the gate line 121 therebetween.

The drain electrode 165 may be disposed in the second contact hole CH2. The drain electrode 165 may be physically/electrically connected to the drain region 154D of the semiconductor layer 154 exposed via the second contact hole CH2. When viewed from the top, the drain electrode 165 and the first data line 171*a* may be spaced apart from each other in the first direction D1.

The drain electrode 165 may be formed by stacking two or more different types of metal layers having different electron mobilities. For example, the drain electrode 165 may be formed by stacking two or more metal layers selected from the group consisting of: aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), copper (Cu), and an alloy thereof. According to an embodiment of the disclosure, the drain electrode 165 may be implemented as triple layers of a Ti/Al/Ti in which titanium is stacked on and under aluminum.

The first protective electrode 166 may be disposed on the drain electrode 165. According to an embodiment of the disclosure, a metal layer for forming the drain electrode 165 may be deposited and the first protective electrode 166 may be deposited. Patterning the drain electrode 165 and the first protective electrode 166 may be carried out using a single mask. The first protective electrode 166 may be made of a transparent conductive oxide including at least one selected from the group consisting of: indium tin oxide (ITO), indium zinc oxide (IZO), zinc oxide (ZnO), indium zinc tin oxide (IZTO), indium oxide ($In_2O_3$), indium gallium oxide (IGO) and aluminum zinc oxide (AZO). According to an embodiment of the disclosure, the first protective electrode layer 166' may be indium tin oxide (ITO).

A fourth insulating layer 189 to be described later may be disposed on the first protective electrode 166. The drain electrode 165 may be exposed via a third contact hole CH3 formed in the fourth insulating layer 189 to be electrically connected to the pixel electrode 190 to be described later. Since the first protective electrode 166 is disposed on the drain electrode 165, it may be possible to prevent damage to the drain electrode 165 during the process of forming the third contact hole CH3 in the fourth insulating layer 189. According to an embodiment of the disclosure, the third contact hole CH3 of the fourth insulating layer 189 may be formed by dry etching. Since the first protective electrode 166 formed of the transparent conductive oxide may have a strong durability to dry etching, it may be possible to prevent the drain electrode 165 disposed under the first protective electrode 166 from being etched. Accordingly, it may be possible to ensure the contact between the drain electrode 165 and the pixel electrode 190, thereby improving the reliability of the display device 1.

A color filter layer 160 may be disposed on the third insulating layer 187 as shown in FIG. 3. In an embodiment, the color filter layer 160 may display one of primary colors such as three primary colors of red, green and blue. It is to be noted that the three primary colors are not limited to red, green and blue but may also include one of cyan, magenta, yellow, and white-based colors.

The color filter layer 160 may not overlap the second contact hole CH2 and may be spaced apart from it in the second direction D2. The color filter layer 160 may overlap a part of the light-blocking layer 220.

The color filter layer 160 may include an organic material. The color filter layer 160 may be thicker than the other layers. For example, a level difference may occur between the upper surface of the color filter layer 160 and the upper surface of the third insulating layer 187.

Although not shown in the drawings, an interlayer insulating film may be disposed on the drain electrode 165. When the interlayer insulating film is positioned on the drain electrode 165, the color filter layer 160 may be located or disposed on the interlayer insulating film.

The fourth insulating layer 189 may be disposed on the third insulating layer 187, the first protective electrode 166 and the color filter layer 160. The fourth insulating layer 189 may include an inorganic material. For example, the fourth insulating layer 189 may include silicon nitride (SiNx), silicon oxide (SiOx), aluminum oxide (AlOx), titanium oxide (TiOx), etc. It is, however, to be understood that the disclosure is not limited thereto. The fourth insulating layer 189 may be implemented as an organic insulating layer. For example, the fourth insulating layer 189 may include a general polymer such as polymethylmethacrylate (PMMA) and polystyrene (PS), a polymer derivative having a phenolic group, an acrylic polymer, an imide polymer, an aryl ether polymer, an amide polymer, a fluorine polymer, a p-xylene polymer, a vinyl alcohol polymer, and blends thereof. The fourth insulating layer 189 as well as the other aforementioned insulating layers made be made of any suitable material as would be appreciated by those of ordinary skill in the art. The fourth insulating layer 189 may prevent permeation of moisture and/or oxygen.

The pixel electrode 190 may be disposed on the fourth insulating layer 189. The pixel electrode 190 may be disposed to overlap the light-transmitting area TA and the light-blocking area BA. The pixel electrode 190 may be physically/electrically connected to the first protective electrode 166 through the third contact hole CH3 and may be electrically connected to the drain electrode 165.

The pixel electrode 190 may be formed of the same material or similar material as the first protective electrode 166. For example, the pixel electrode 190 may be made of a transparent conductive oxide including at least one selected from the group consisting of: indium tin oxide (ITO), indium zinc oxide (IZO), zinc oxide (ZnO), indium zinc tin oxide (IZTO), indium oxide ($In_2O_3$), indium gallium oxide (IGO) and aluminum zinc oxide (AZO). Accordingly, it may be possible to ensure the contact between the drain electrode 165 and the pixel electrode 190, thereby improving the reliability of the display device 1.

The pixel electrode 190 may be disposed between the first data line 171a and the second data line 171b and may not overlap the first data line 171a and the second data line 171b as shown in FIG. 2. It is, however, to be understood that the disclosure is not limited thereto. At least a part of the pixel electrode 190 may overlap the first data line 171a and/or the second data line 171b.

The organic layer 130 may be disposed over the fourth insulating layer 189. The organic layer 130 may be disposed on substantially the entire area except for the light-transmitting area TA. In other words, the organic layer 130 may be disposed to cover most of the light-blocking area BA as shown in FIG. 3.

The organic layer 130 may partially overlap the color filter layer 160 in the cross-sectional view. The organic layer 130 may be disposed to provide a flat surface over the level difference occurred by the color filter layer 160 and may be disposed to cover the side surface of the color filter layer 160. The upper surface of the organic layer 130 and the upper surface of the pixel electrode 190 disposed on the upper surface of the color filter layer 160 may be disposed on substantially a single plane. In other words, the upper surface of the organic layer 130 may be substantially aligned with the upper surface of the pixel electrode 190. For example, the distance to the upper surface of the organic layer 130 from the upper surface of the third insulating layer 187 may be substantially equal to the distance to the upper surface of the color filter layer 160 from the upper surface of the third insulating layer 187. The distance to the upper surface of the organic layer 130 from the upper surface of the first base 110 may be substantially equal to the distance to the upper surface of the color filter layer 160 from the upper surface of the first base 110.

In some embodiments, the organic layer 130 may be a planarization layer. The organic layer 130 may include an organic material, and in some embodiments, the organic material may be a photosensitive organic material. For example, the organic layer 130 may be either a negative photosensitive organic material or a positive photosensitive organic material. A more detailed description thereon will be made below.

As described above, the color filter layer 160 may have a thickness of a predetermined level or more, and as an example, there may be the level difference between the upper surface of the third insulating layer 187 and the upper surface of the color filter layer 160. The liquid-crystal layer 300 may be displaced along the side slope of the color filter layer 160 due to the level difference occurred by the color filter layer 160. When this happens, light may leak at the side slope portion of the color filter layer 160 and accordingly the image quality of the display device 1 may be deteriorated.

In contrast, by disposing the organic layer 130, it may be possible to provide a flat surface over the level difference occurred by the color filter layer 160, and thus the liquid-crystal layer 300 may not be disposed along the side slope of the color filter layer 160. By doing so, the liquid-crystal layer 300 may be uniformly disposed and aligned in the entire area of the display device 1, and accordingly, it may be possible to prevent light leakage which otherwise occurs at the side slope portion of the color filter layer 160.

Hereinafter, the second display substrate 200 will be described.

The second display substrate 200 may include a second base 210 and a common electrode 270.

The second base 210 may be a transparent insulating substrate similar to the first base 110. The second base 210 may include a polymer or plastic that is highly resistant to heat. In some embodiments, the second base 210 may have flexibility.

The common electrode 270 may be disposed on the surface of the second base 210 facing the first display substrate 100. The common electrode 270 may be made of a transparent conductive material such as ITO and IZO. In some embodiments, the common electrode 270 may be formed throughout the entire surface of the second base 210. A common voltage $V_{com}$ may be applied to the common electrode 270 to form an electric field together with the pixel electrode 190.

The liquid-crystal layer 300 may be interposed between the first display substrate 100 and the second display substrate 200. The liquid-crystal layer 300 may include liquid-crystal molecules having dielectric anisotropy. When an electric field is applied between the first display substrate 100 and the second display substrate 200, the liquid-crystal molecules rotate in a direction between the first display substrate 100 and the second display substrate 200, to transmit or block the light. Herein, the term rotation may refer not only to actual rotation of the liquid-crystal molecules but also to a change in orientation of the liquid-crystal molecules by the electric field.

Figure 4B:
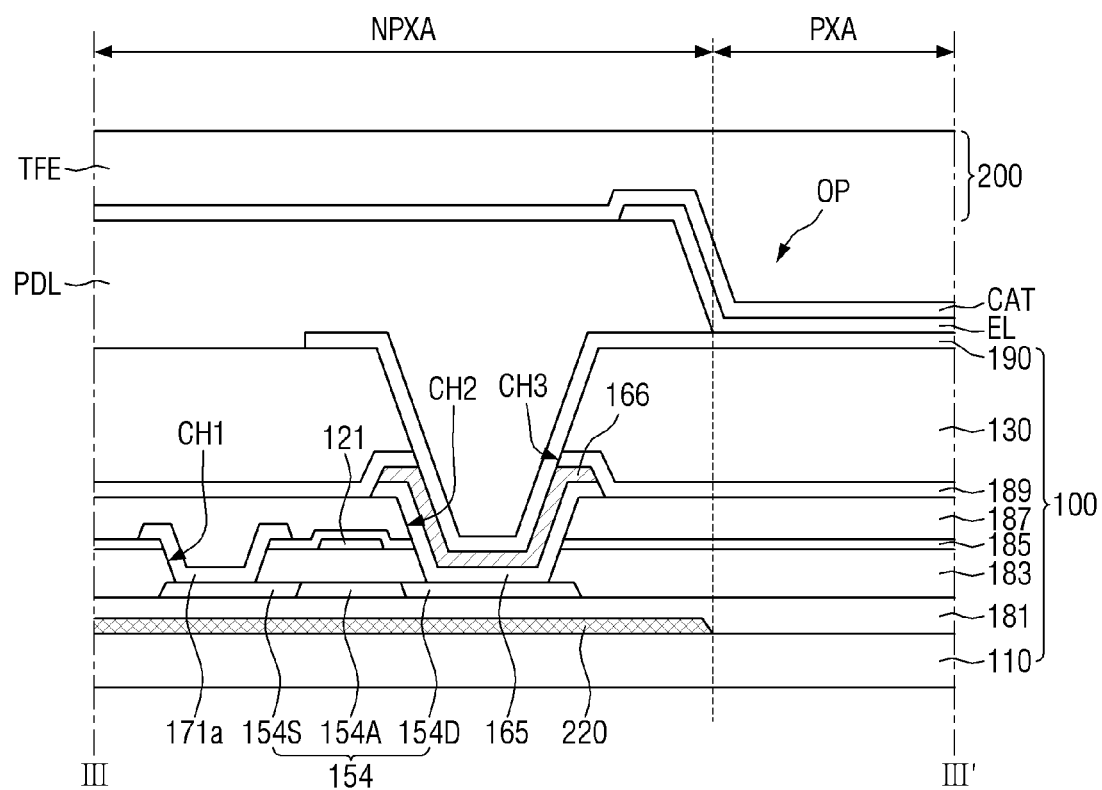
FIG. 4B is a schematic cross-sectional view of the display device according to the embodiment shown in FIG. 2, taken along line III-III'.

FIG. 4B is a schematic cross-sectional view of the display device according to the embodiment shown in FIG. 2, taken along line III-III'.

The embodiment shown in FIG. 4B is different from the embodiment shown in FIGS. 2 to 4A in that the color filter layer 160 is eliminated and a pixel-defining layer PDL, an organic emitting layer EL, a common electrode CAT, and a thin-film encapsulation layer TFE are included.

For example, a fourth insulating layer 189 may be disposed on the first protective electrode 166. The first protective electrode 166 may be exposed via a third contact hole CH3 formed in the fourth insulating layer 189 to be electrically connected to the pixel electrode 190. The pixel electrode 190 may be physically/electrically connected to the first protective electrode 166 and may be electrically connected to the drain electrode 165. According to an embodiment of the disclosure, the pixel electrode 190 may be an anode electrode.

Since the first protective electrode 166 is disposed on the drain electrode 165, it may be possible to prevent damage to the drain electrode 165 during the process of forming the third contact hole CH3 in the fourth insulating layer 189.

The organic layer 130 may be disposed over the fourth insulating layer 189. The organic layer 130 may be disposed in an emission area EA and a non-emission area NEA to be described below. In some embodiments, the organic layer 130 may serve as a planarization layer. The organic layer 130 may include an organic material, and in some embodiments, the organic material may be a photosensitive organic material.

The pixel-defining layer PDL may be formed on the edges of the organic layer 130 and the pixel electrode 190. The pixel-defining layer PDL may include an opening OP for exposing the pixel electrode 190. The pixel-defining layer PDL may define each of the pixel areas.

The pixel-defining layer PDL may be an organic insulating layer made of an organic material. As the organic material, an organic insulating material such as a polyacrylic compound, a polyimide compound, a fluorine-based carbon compound such as Teflon™ and a benzocyclobutene compound may be used.

The organic emitting layer EL may be disposed in the opening of the pixel-defining layer PDL.

The organic emitting layer EL may include low molecular weight materials or polymeric materials. The low molecular weight materials may include copper phthalocyanine (CuPc), N,N'-Di(PAphthalene-1-yl)-N,N'-diphenyl-benzidine (NPB), tris-8-hydroxyquinoline aluminum (Alq3), etc. or other suitable materials known and appreciated by those of ordinary skill in the art. Such materials may be formed by vacuum deposition. The polymeric materials may include PEDOT, poly-Phenylenevinylene (PPV), polyfluorene, etc. or other suitable materials known and appreciated by those of ordinary skill in the art.

The organic emitting layer EL may be implemented as a single layer but may be implemented as multiple layers including a variety of functional layers. When the organic emitting layer EL is implemented as multiple layers, it may have a structure in which a hole injection layer, a hole transport layer, an emission layer, an electron transport layer, and an electron injection layer, etc. are stacked on one another as a single or complex structure.

The pixels PX may be disposed in a display area. The display area may include an emission zone PXA and a non-emission zone NPXA adjacent to the emission zone PXA. The non-emission zone NPXA may surround the emission zone PXA. The emission zone PXA of FIG. 4B may be defined in line with a portion of the pixel electrode 190 exposed via the opening OP.

When the organic emitting layer EL includes all of the above-listed elements, the hole injection layer may be disposed on the pixel electrode 190 which may be the anode electrode, and the hole transport layer, the emission layer, the electron transport layer, and the electron injection layer may be sequentially stacked on one another.

The organic emitting layer EL may include a red organic emitting layer that emits red light, a green organic emitting layer that emits green light, and a blue organic emitting layer that emits blue light. The red organic emitting layer, the green organic emitting layer and the blue organic emitting layer may be formed in a red pixel, a green pixel and blue pixel, respectively, to display color images.

The organic emitting layer EL may be stacked as a red organic emitting layer, a green organic emitting layer and a blue organic emitting layer in a red pixel, a green pixel and a blue pixel, respectively, and a red color filter, a green color filter and a blue color filter may be formed in the respective pixels, to represent color images.

As another example, a white organic emitting layer emitting white light may be formed in all of the red pixels, the green pixels, and the blue pixels, and the red color filter, the green color filter and the blue color filter may be formed in the pixels, respectively, to display color images.

It is to be understood that the white organic emitting layer described above may be formed not only as a single organic emitting layer but also as a stack of organic emitting layers to emit white light.

For example, white light may be emitted by combining at least one yellow organic emitting layer and at least one blue organic emitting layer, white light may be emitted by combining at least one cyan organic emitting layer and at least one red organic emitting layer, white light may be emitted by combining at least one magenta organic emitting layer and at least one green organic emitting layer, and so on.

The common electrode CAT may be disposed on the pixel-defining layer PDL and the organic emitting layer EL.

The common electrode CAT may be implemented as a metal layer such as silver (Ag), magnesium (Mg), aluminum (Al), platinum (Pt), palladium (Pd), gold (Au), nickel (Ni), neodymium (Nd), iridium (Ir) and chromium (Cr) and/or a transparent conductive layer such as indium tin oxide (ITO), indium zinc oxide (IZO), zinc oxide (ZnO) and indium tin zinc oxide (ITZO). According to an embodiment of the disclosure, the common electrode CAT may be made up of two or more layers including a metal thin-film, e.g., triple layers of ITO/Ag/ITO.

As described above, as the pixel electrode 190 serves as the anode electrode of the organic light-emitting diode the common electrode CAT may serve as the cathode electrode of the organic light-emitting diode.

It is, however, to be noted that the pixel electrode 190 may serve as the cathode electrode while the common electrode CAT may serve as the anode electrode in some implementations. The pixel electrode 190, the organic emitting layer EL and the common electrode CAT form an organic light-emitting diode.

The thin-film encapsulation layer TFE may be disposed on the common electrode CAT to protect the organic light-emitting diode. The thin-film encapsulation layer TFE may be made up of a single layer including one of a first inorganic layer, an organic layer and a second inorganic layer, but may be made up of multiple layers formed by stacking two or more layers.

Hereinafter, a method of fabricating the display device 1 shown in FIGS. 1 to 4A will be described.

FIGS. 5 to 15 are schematic cross-sectional views illustrating a method of fabricating the display device shown in FIGS. 1 to 4A, and by way of example, schematic cross-sectional views showing the processing steps, taken along line IV-IV of FIG. 2.

Figure 5:
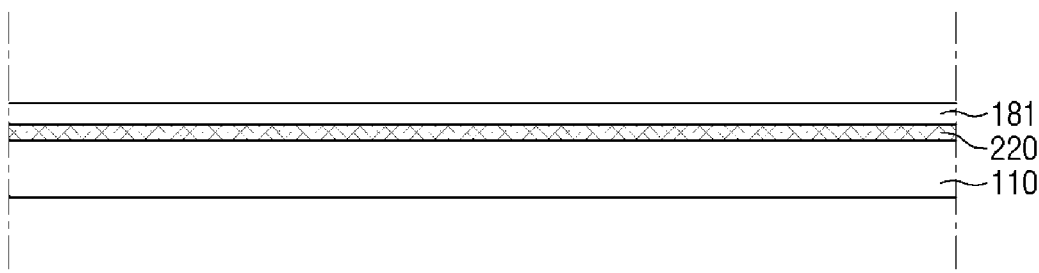
FIGS. 5 to 15 are schematic cross-sectional views illustrating a method of fabricating the display device shown in FIGS. 1 to 4A, and for example, schematic cross-sectional views showing the processing steps, taken along line IV-IV of FIG. 2.

Referring first to FIG. 5, a light-blocking layer 220 may be formed on a first base 110, and a buffer layer 181 may be formed on the light-blocking layer 220.

Figure 6:
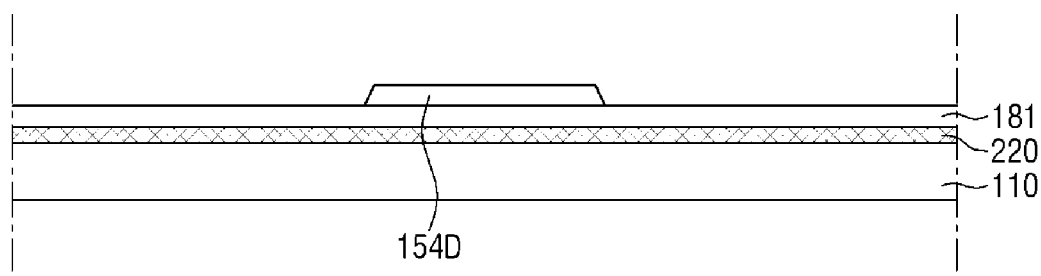

As shown in FIGS. 3 and 6, a semiconductor layer 154 overlapping the light-blocking layer 220 may be formed on the buffer layer 181. The semiconductor layer 154 may include a source region 154S, a drain region 154D and a channel region 154A. The source region 154S and the drain region 154D may be formed by doping impurity ions. In the following description, the semiconductor layer 154 is referred to as the drain region 154D for convenience of illustration.

Figure 7:
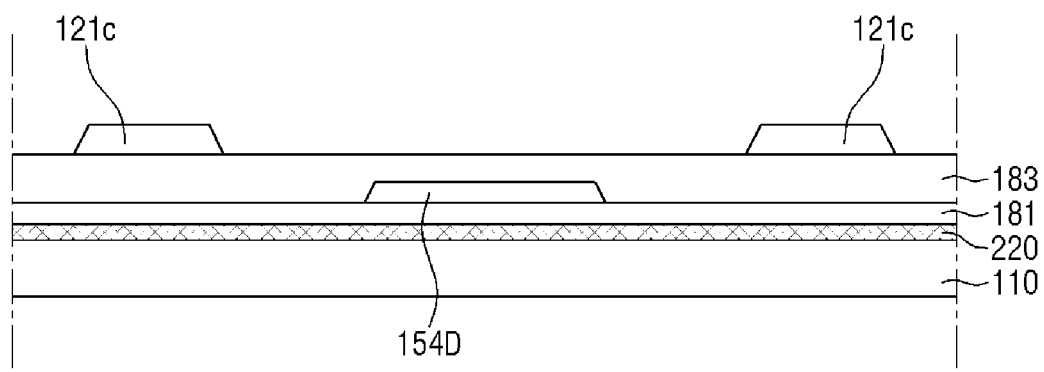

As shown in FIG. 7, a first insulating layer 183 may be formed on the drain region 154D and the buffer layer 181. The first insulating layer 183 may be made of an inorganic material such as silicon nitride (SiNx), silicon oxide (SiO$_2$) and silicon oxynitride (SiOxNy), and in some embodiments, may be formed by a high density plasma (HDP) deposition.

A gate line 121 may be formed on the first insulating layer 183. The gate line 121 may be extended generally along the first direction D1 and may be bent in at least one direction on a plane. For example, the first portion 121a of the gate line 121 may be extended in the first direction D1, the second portion 121b may be bent from the first portion 121a or the third portion 121c to be extended in the second direction D2, and the third portion 121c may be bent from the second portion 121b to be extended in the first direction D1. Therefore, the gate line 121 may be extended in the first direction D1, may bypass the first protective electrode 166, the drain electrode 165, or the second contact hole CH2 on a plane. The gate line 121 may be formed so that it does not overlap the drain region 154D of the semiconductor layer 154.

Figure 8:
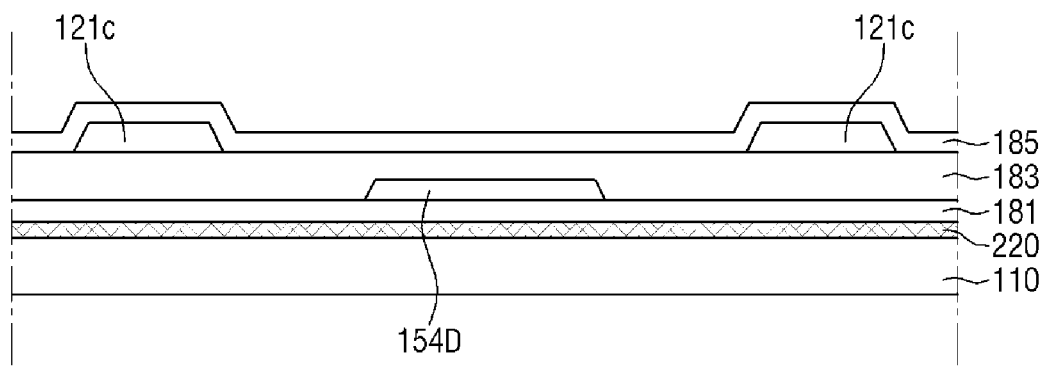

As shown in FIG. 8, a second insulating layer 185 covering a portion of a gate line 121c may be formed on the first insulating layer 183. The second insulating layer 185 may be made of an inorganic material such as silicon nitride (SiNx), silicon oxide (SiO$_2$) and silicon oxynitride (SiOxNy), and in some embodiments, may be formed by a plasma CVD technique.

Figure 9:
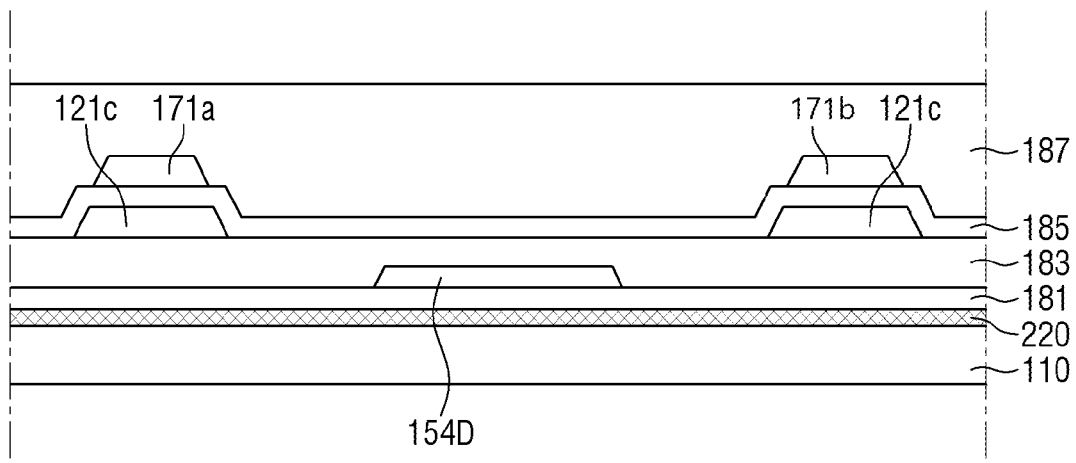

As shown in FIG. 3, a first contact hole CH1 exposing the source region 154S may be formed in the first insulating layer 183 and the second insulating layer 185. As shown in FIG. 2, data lines extended in the second direction D2 and intersecting the gate line 121, i.e., the first data line 171a and the second data line 171b are formed. At least a part of the first data line 171a may be disposed inside the first contact hole CH1 and may be physically/electrically connected to the source region 154S of the semiconductor layer 154 exposed via the first contact hole CH1. Accordingly, a part of the first data line 171a may serve as the source electrode of the thin-film transistor. As shown in FIG. 9, a third insulating layer 187 may be formed on the second insulating layer 185 and the data lines 171a and 171b. The third insulating layer 187 may be made of an insulating material. For example, the insulating material may be an inorganic material such as silicon nitride (SiNx), silicon oxide (SiO$_2$) and silicon oxynitride (SiOxNy).

Figure 10:
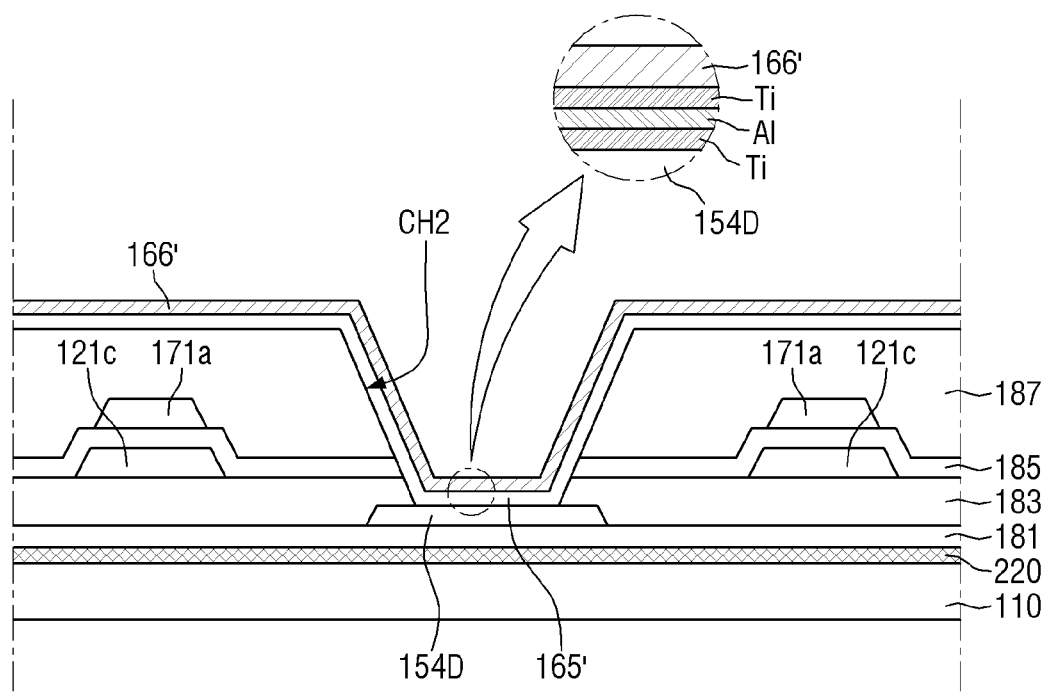

As shown in FIG. 10, a second contact hole CH2 exposing the drain region 154D of the semiconductor layer 154 may be formed in the first insulating layer 183, the second insulating layer 185 and the third insulating layer 187. A drain electrode layer 165' may be formed on the first insulating layer 183, the second insulating layer 185, the third insulating layer 187 and the second contact hole CH2. The drain electrode layer 165' may be physically/electrically connected to the drain region 154D of the semiconductor layer 154 exposed via the second contact hole CH2. The drain electrode layer 165' may be formed by stacking two or more different types of metal layers having different electron mobilities. For example, the drain electrode layer 165' may be formed by stacking two or more metal layers selected from the group consisting of: aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), molybdenum (Mo), titanium (Ti), tungsten (W), copper (Cu), and an alloy thereof. According to an embodiment of the disclosure, the drain electrode 165 may be implemented as triple layers of a Ti/Al/Ti in which titanium is stacked on and under aluminum.

A first protective electrode layer 166' may be formed on the drain electrode layer 165'. The first protective electrode layer 166' may be made of a transparent conductive oxide including at least one selected from the group consisting of: indium tin oxide (ITO), indium zinc oxide (IZO), zinc oxide (ZnO), indium zinc tin oxide (IZTO), indium oxide (In$_2$O$_3$), indium gallium oxide (IGO) and aluminum zinc oxide (AZO). According to an embodiment of the disclosure, the first protective electrode layer 166' may be indium tin oxide (ITO).

Figure 11:
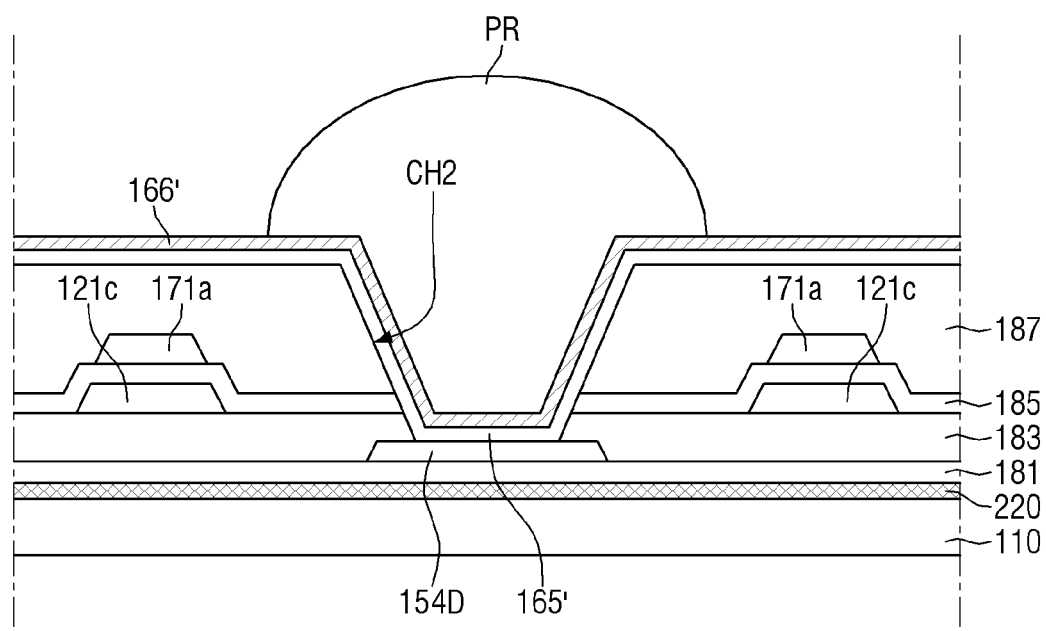

As shown in FIG. 11, a photoresist pattern PR may be formed on the drain electrode layer 165' and the first protective electrode layer 166' by a photolithography process using a mask. The photoresist pattern PR may be disposed to overlap the second contact hole CH2 to form the drain electrode 165 and the first protective electrode 166. As shown in FIG. 11, the photoresist pattern PR may be formed up to the peripheral area of the second contact hole CH2, but the disclosure is not limited thereto. The photoresist pattern PR may be formed inside the second contact hole CH2 or only inside the second contact hole CH2.

The first protective electrode layer 166' may be patterned by a wet etching process using the photoresist pattern PR, such that the first protective electrode 166 is formed. The drain electrode layer 165' may be patterned by a dry etching process using the same photoresist pattern PR, such that the drain electrode 165 is formed. The photoresist pattern PR remaining on the drain electrode 165 and the first protective electrode 166 may be removed by a stripping process.

Figure 12:
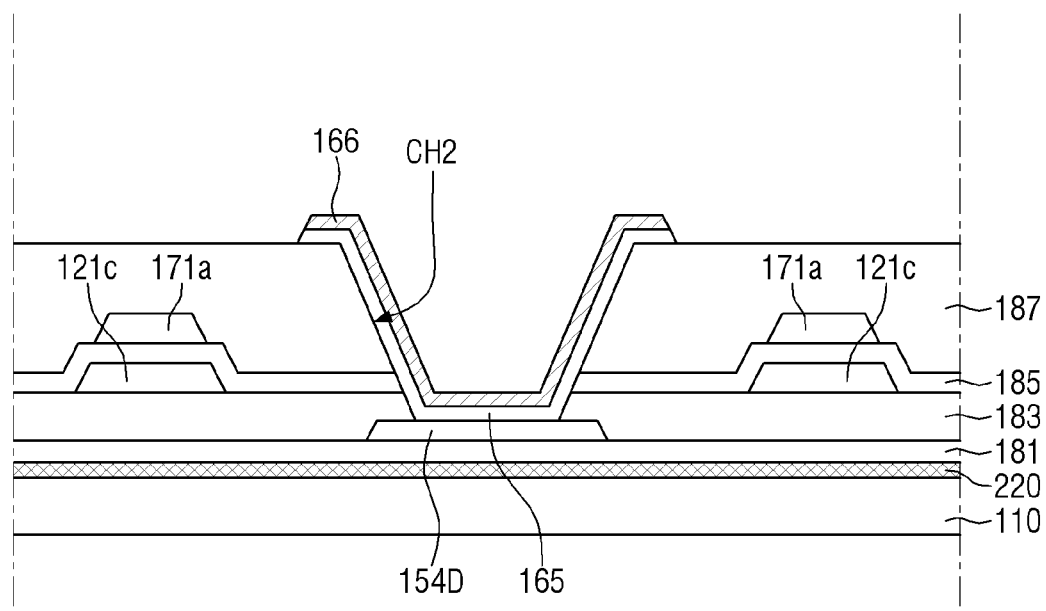

As a result, as shown in FIG. 12, the drain electrode 165 and the first protective electrode 166 may be formed in the second contact hole CH2 as well as on the peripheral area.

As shown in FIG. 3, a color filter layer 160 may be formed on the third insulating layer 187 where the second contact hole CH2, the drain electrode 165 and the first protective electrode 166 may be formed. The color filter layer 160 overlaps a part of the light-blocking layer 220 but does not overlap the second contact hole CH2, as described above. The color filter layer 160 may include an organic material and may include a colorant having a color.

Figure 13:
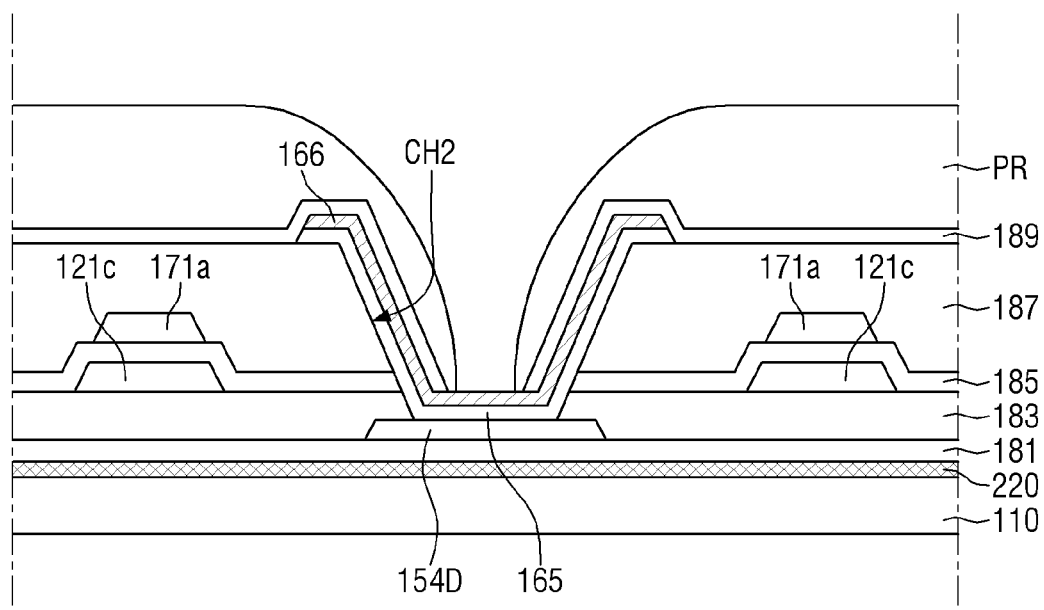

As shown in FIG. 13, a fourth insulating layer 189 may be formed on the color filter layer 160 and on a part of the third insulating layer 187 where the color filter layer 160 is not formed. The fourth insulating layer 189 may be made of an insulating material such as silicon nitride (SiNx), silicon oxide (SiO$_2$) and silicon oxynitride (SiOxNy). It is, however, to be understood that the disclosure is not limited thereto. The fourth insulating layer 189 may be implemented as an organic insulating layer. For example, the fourth insulating layer 189 may include a general polymer such as polymethylmethacrylate (PMMA) and polystyrene (PS), a polymer derivative having a phenolic group, an acrylic polymer, an imide polymer, an aryl ether polymer, an amide polymer, a fluorine polymer, a p-xylene polymer, a vinyl alcohol polymer, and blends thereof.

The photoresist pattern PR may be formed on the fourth insulating layer 189 via a photolithography process using a mask. The photoresist pattern PR may be disposed on the fourth insulating layer 189 such that it overlaps the second contact hole CH2 in order to form a third contact hole CH3. The third contact hole CH3 formed in the fourth insulating layer 189 may be smaller than the second contact hole CH2 formed in the first insulating layer 183, the second insulating layer 185 and the third insulating layer 187.

The fourth insulating layer 189 may be patterned by a dry etching process using the photoresist pattern PR to form a third contact hole CH3.

If the first protective electrode 166 is not disposed on the drain electrode 165, there may be damage to the drain electrode 165 during the process of forming the third contact hole CH3 in the fourth insulating layer 189. According to an embodiment of the disclosure, the drain electrode 165 may be implemented as triple layers of a Ti/Al/Ti in which titanium is stacked on and under aluminum. To form the third contact hole CH3, the etching thickness may be larger than the thickness of the fourth insulating layer 189, in order to make sure that the drain electrode 165 covered by the fourth insulating layer 189 is exposed. In doing so, a part of the aluminum (Al) layer and the upper titanium (Ti) layer of the drain electrode 165 may be etched. If the photoresist pattern PR is patterned less than the width of the third contact hole CH3 or if the thickness of the fourth insulating layer 189 is relatively thick, as appreciated and understood by those of ordinary skill in the art, a part of the etched aluminum (Al) layer and the etched upper titanium (Ti) may not be removed, such that a fence-shaped protrusion may be formed on the aluminum (AL) layer. As a result, there may be failure in the connection between the pixel electrode 190 and the drain electrode 165.

In contrast, according to the embodiment of the disclosure, the first protective electrode 166 is disposed on the drain electrode 165, and thus it may be possible to prevent damage to the drain electrode 165 during the process of forming the third contact hole CH3 in the fourth insulating layer 189. Since the first protective electrode 166 formed of the transparent conductive oxide may have a strong durability to dry etching, it may be rarely etched. Therefore, it may be possible to prevent the drain electrode 165 disposed under the first protective electrode 166 from being etched. Accordingly, it may be possible to ensure the contact between the drain electrode 165 and the pixel electrode 190, thereby improving the reliability of the display device 1.

The photoresist pattern PR remaining on the fourth insulating layer 189 may be removed by a stripping process.

Figure 14:
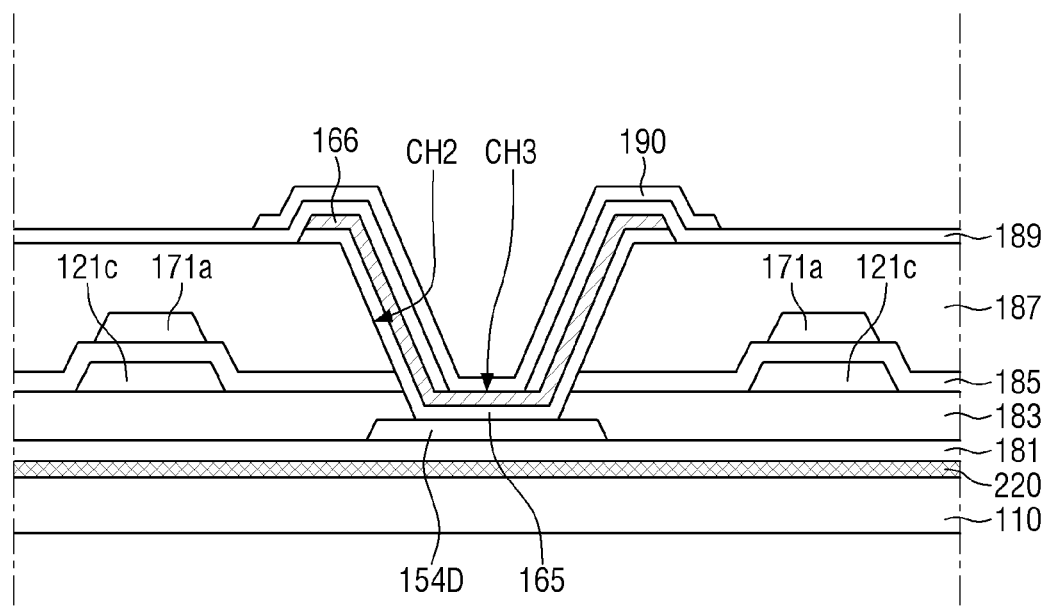
Figure 15:
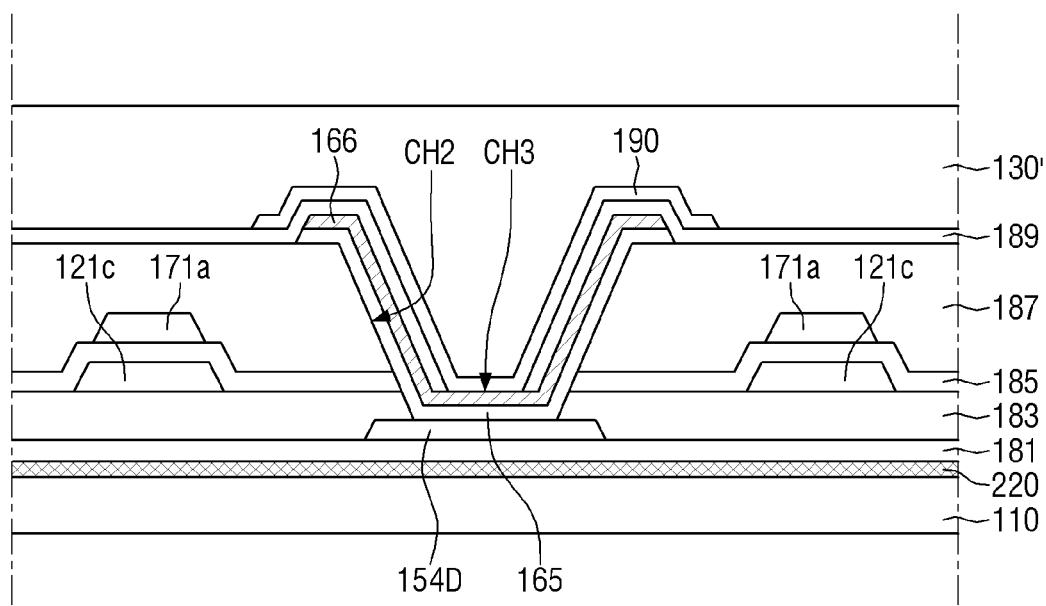
Figure 16:
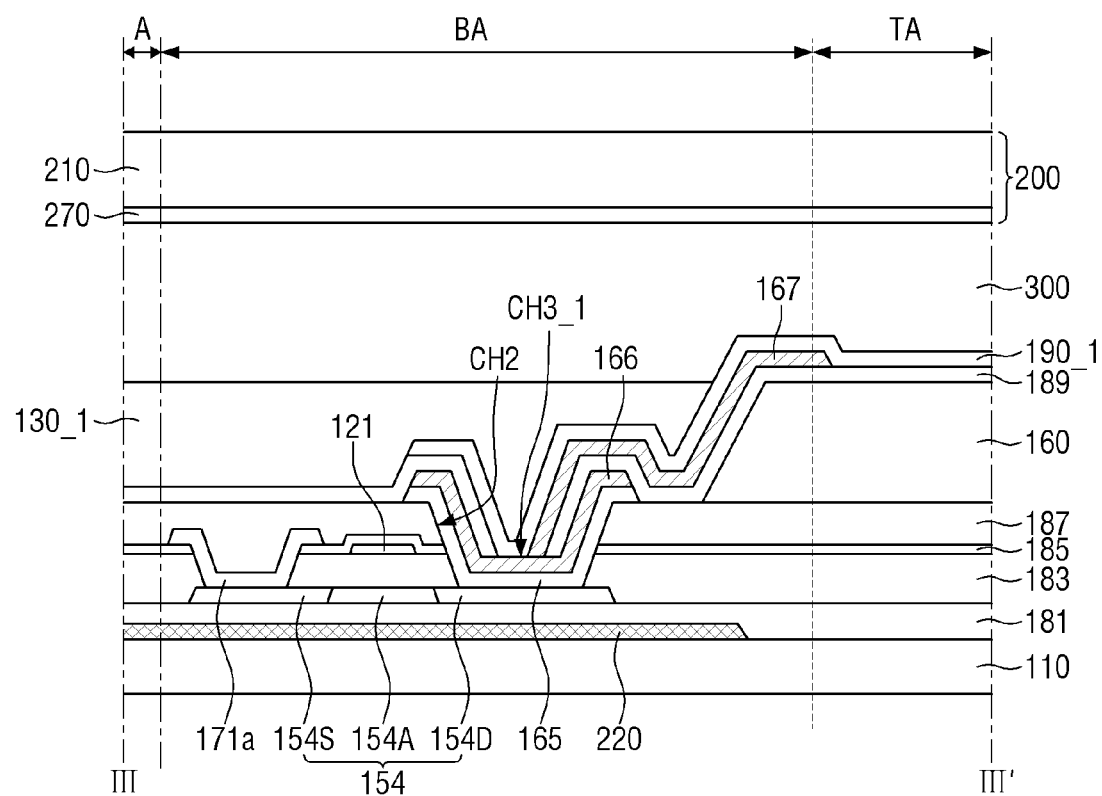
FIG. 16 is a schematic cross-sectional view of the display device according to another embodiment shown in FIG. 2, taken along line III-III'.

As a result, as shown in FIG. 14, the third contact hole CH3 may be formed in the fourth insulating layer 189 so that the first protective electrode 166 formed to overlap the second contact hole CH2 may be exposed. Referring to FIGS. 15 and 16, a transparent conductive material may be deposited on the fourth insulating layer 189. The transparent conductive material may be patterned by a photolithography process using a mask, to form a pixel electrode 190. The pixel electrode 190 (190_1 of FIG. 16) may be physically/electrically connected to the first protective electrode 166 through the third contact hole CH3 (CH3_1 of FIG. 16).

The pixel electrode 190 may be formed of the same or similar material as the first protective electrode 166. For example, the pixel electrode 190 may be made of a transparent conductive oxide including at least one selected from the group consisting of: indium tin oxide (ITO), indium zinc oxide (IZO), zinc oxide (ZnO), indium zinc tin oxide (IZTO), indium oxide ($In_2O_3$), indium gallium oxide (IGO) and aluminum zinc oxide (AZO). Accordingly, the pixel electrode 190 (190_1 of FIG. 16) connected to the first protective electrode 166 may be electrically connected to the drain electrode 165. Accordingly, it may be possible to ensure the contact between the drain electrode 165 and the pixel electrode 190 (190_1 of FIG. 16), thereby improving the reliability of the display device 1.

As shown in FIG. 15, an organic material may be applied throughout the surface of the first substrate 110 to form an organic material layer 130'. As described above, the organic material layer 130' may include a photosensitive organic material. The organic material may be a negative photosensitive organic material or a positive photosensitive organic material.

The organic material layer 130' may be formed to cover the entirety of the fourth insulating layer 189, the pixel electrode 190 and the third contact hole CH3. As an example, the organic material layer 130' may overlap the entire color filter layer 160 when viewed from the top. The distance to the upper surface of the organic material layer 130' from the upper surface of the third insulating layer 187 may be larger than the distance to the upper surface of the color filter layer 160 from the upper surface of the third insulating layer 187. In other words, the thickness of the organic material layer 130' may be larger than the thickness of the color filter layer 160 where the color filter layer 160 is not disposed.

The organic material layer 130' is exposed to light, and unnecessary portions are removed, to form the organic layer 130 as shown in FIG. 3. For example, when the organic material layer 130' includes a negative photosensitive organic material, under-exposure is carried out at the location where the organic layer 130 is to be formed to cure the organic material, and the unexposed organic material layer 130' is removed, to form the organic layer 130. For example, when the organic material layer 130' includes a positive photosensitive organic material, the organic material layer 130' is exposed to light except for the portion where the organic layer 130 is to be formed and the exposed portion of the organic material layer 130' is removed, to form the organic layer 130.

In this manner, the first display substrate 100 (see FIGS. 1 and 3) shown in FIGS. 1 to 4A is formed, so that the display device 1 according to the embodiment of the disclosure may be fabricated.

Hereinafter, embodiments of the disclosure will be described. In the following description, the same or similar elements will be denoted by the same or similar reference numerals, and redundant descriptions will be omitted or briefly described. Descriptions will be made focusing on differences from the above embodiment.

FIG. 16 is a schematic cross-sectional view of the display device according to the exemplary embodiment shown in FIG. 2, taken along line III-III'.

The embodiment shown in FIG. 16 is different from the embodiment shown in FIG. 3 in that a second protective electrode 167 may be disposed on the portion of the fourth insulating layer 189 between one end of the color filter layer 160 and one end of the third contact hole CH3_1.

The fourth insulating layer 189 may be disposed on the third insulating layer 187, the first protective electrode 166 and the color filter layer 160. The fourth insulating layer 189 may include an inorganic material. For example, the fourth insulating layer 189 may include silicon nitride (SiNx), silicon oxide (SiOx), aluminum oxide (AlOx), titanium oxide (TiOx), etc. It is, however, to be understood that the disclosure is not limited thereto. The fourth insulating layer 189 may be implemented as an organic insulating layer. For example, the fourth insulating layer 189 may include a general polymer such as polymethylmethacrylate (PMMA) and polystyrene (PS), a polymer derivative having a phenolic group, an acrylic polymer, an imide polymer, an aryl ether polymer, an amide polymer, a fluorine polymer, a p-xylene polymer, a vinyl alcohol polymer, and blends thereof. The fourth insulating layer 189 may prevent permeation of moisture and/or oxygen.

The second protective electrode 167 may be disposed on the fourth insulating layer 189. The second protective electrode 167 may be disposed to overlap between the end of the color filter layer 160 positioned at the boundary between the light-transmitting area TA and the light-blocking area BA and the end of the third contact hole CH3_1.

The second protective electrode 167 may be made of a transparent conductive oxide including at least one selected from the group consisting of: indium tin oxide (ITO), indium zinc oxide (IZO), zinc oxide (ZnO), indium zinc tin oxide (IZTO), indium oxide ($In_2O_3$), indium gallium oxide (IGO) and aluminum zinc oxide (AZO). According to an embodiment of the disclosure, the second protective electrode 167 may be indium tin oxide (ITO).

A pixel electrode 190_1 may be disposed on the second protective electrode 167 and the fourth insulating layer 189. The pixel electrode 190_1 may be disposed to overlap the light-transmitting area TA and the light-blocking area BA, and the pixel electrode 190 may be physically/electrically connected to the first protective electrode 166 and may be electrically connected to the drain electrode 165 through the third contact hole CH3_1.

The pixel electrode 190_1 may be formed of the same or similar material as the first protective electrode 166 and the second protective electrode 167. For example, the pixel electrode 190_1 may be made of a transparent conductive oxide including at least one selected from the group consisting of: indium tin oxide (ITO), indium zinc oxide (IZO), zinc oxide (ZnO), indium zinc tin oxide (IZTO), indium oxide ($In_2O_3$), indium gallium oxide (IGO) and aluminum zinc oxide (AZO). Accordingly, it may be possible to ensure the contact between the drain electrode 165 and the pixel electrode 190, thereby improving the reliability of the display device 1.

In the photolithography process for forming the third contact hole CH3_1 to be described later, even when the photoresist pattern PR may not be aligned with the position where the third contact hole CH3_1 is to be formed, the second protective electrode 167 may serve as a protective layer, thereby preventing damage to the color filter layer 160.

Figure 17:
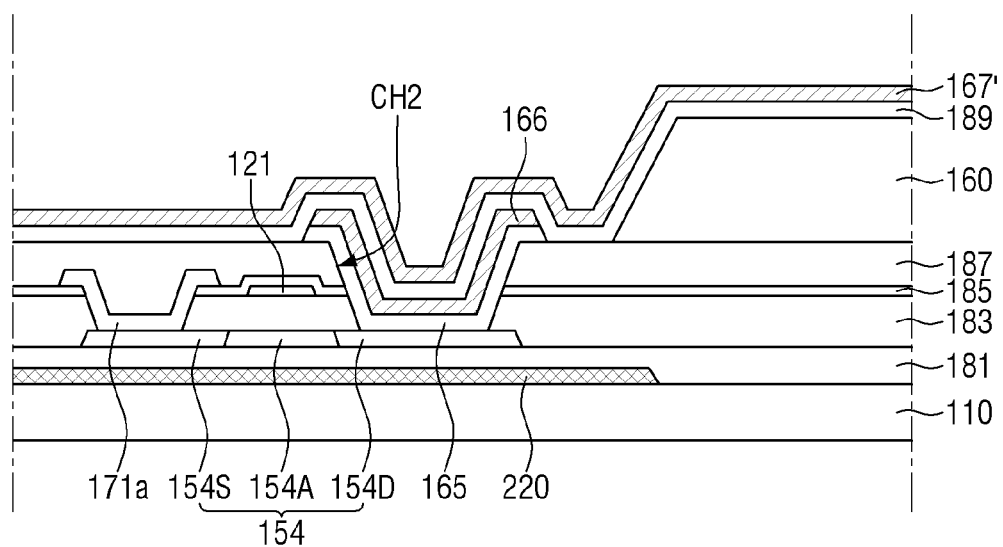
FIGS. 17 to 19 are schematic cross-sectional views illustrating a method of fabricating the display device shown in FIG. 16, and for example, schematic cross-sectional views illustrating the processing steps taken along line III-III' of FIG. 2.
Figure 18:
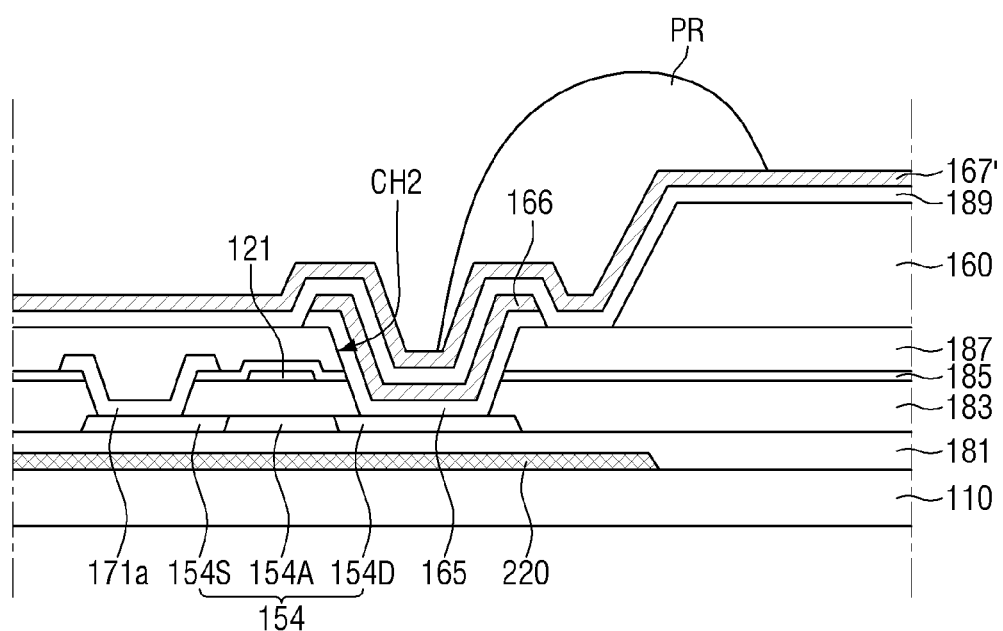
Figure 19:
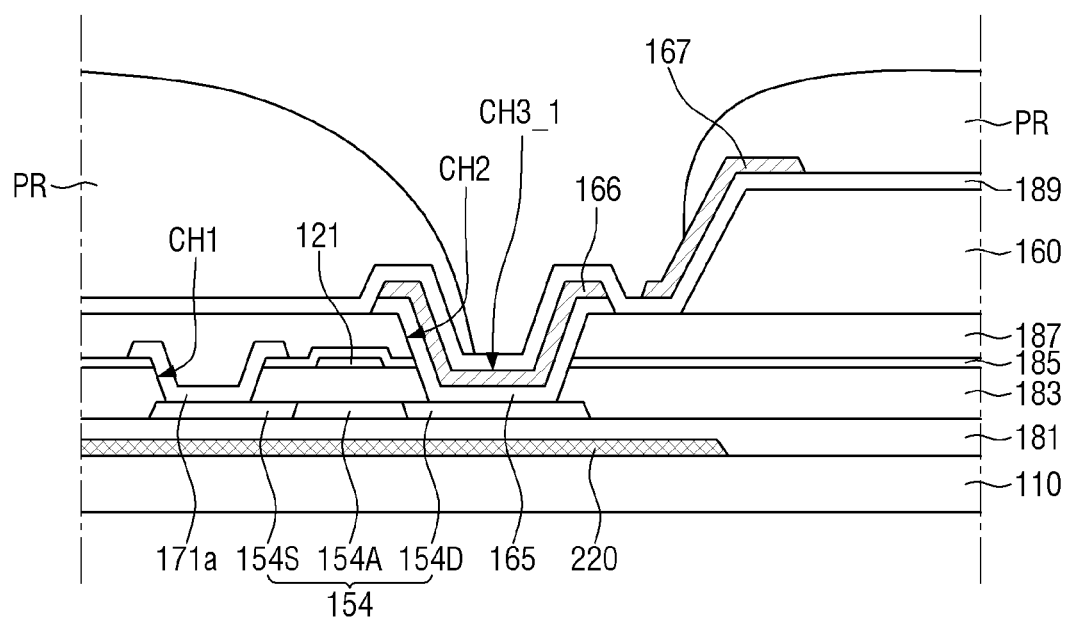

FIGS. 17 to 19 are schematic cross-sectional views illustrating a method of fabricating the display device shown in FIG. 16, and by way of example, schematic cross-sectional views illustrating the processing steps taken along line III-III' of FIG. 2.

As shown in FIG. 17, a first protective electrode 166 may be formed in the second contact hole CH2 as well as on the peripheral area via a photolithography process.

A color filter layer 160 may be formed on the third insulating layer 187 where the second contact hole CH2, the drain electrode 165 and the first protective electrode 166 may be formed. The color filter layer 160 overlaps a part of the light-blocking layer 220 but does not overlap the second contact hole CH2, as described above. The color filter layer 160 may include an organic material and may include a colorant having a color.

A fourth insulating layer 189 may be formed on the color filter layer 160 and on a part of the third insulating layer 187 where the color filter layer 160 is not formed. The fourth insulating layer 189 may be made of an insulating material such as silicon nitride (SiNx), silicon oxide ($SiO_2$) and silicon oxynitride (SiOxNy). It is, however, to be understood that the disclosure is not limited thereto. The fourth insulating layer 189 may be implemented as an organic insulating layer. For example, the fourth insulating layer 189 may include a general polymer such as polymethylmethacrylate (PMMA) and polystyrene (PS), a polymer derivative having a phenolic group, an acrylic polymer, an imide polymer, an aryl ether polymer, an amide polymer, a fluorine polymer, a p-xylene polymer, a vinyl alcohol polymer, and blends thereof.

A second protective electrode layer 167' may be formed on the fourth insulating layer 189. The second protective electrode layer 167' may be made of a transparent conductive oxide including at least one selected from the group consisting of: indium tin oxide (ITO), indium zinc oxide (IZO), zinc oxide (ZnO), indium zinc tin oxide (IZTO), indium oxide ($In_2O_3$), indium gallium oxide (IGO) and aluminum zinc oxide (AZO). According to an embodiment of the disclosure, the second protective electrode layer 167' may be indium tin oxide (ITO).

As shown in FIG. 18, a photoresist pattern PR may be formed on the second protective electrode layer 167' via a photolithography process using a mask. The photoresist pattern PR may be disposed to overlap between one end of the color filter layer 160 and one end of the second contact hole CH2 to form the second protective electrode 167.

As shown in FIG. 18, the photoresist pattern PR may be extended to the inside of the second contact hole CH2. It is, however, to be understood that the disclosure is not limited thereto. The photoresist pattern PR may not overlap the second contact hole CH2.

The second protective electrode layer 167' may be patterned via a wet etching process using the photoresist pattern PR, such that the second protective electrode 167 is formed. The photoresist pattern PR remaining on the second protective electrode 167 may be removed by a stripping process.

Referring to FIG. 19, a photoresist pattern PR may be formed on the fourth insulating layer 189 where the second protective electrode 167 may be formed via a photolithography process using a mask. According to an embodiment of the disclosure, the photoresist pattern PR may be disposed on the fourth insulating layer 189 such that it may overlap the second contact hole CH2 in order to form a third contact hole CH3_1. The fourth insulating layer 189 may be patterned by a dry etching process using the photoresist pattern PR to form the third contact hole CH3_1. The photoresist pattern PR remaining on the fourth insulating layer 189 may be removed by a stripping process.

As shown in FIG. 19, during the photolithography process, the photoresist pattern PR may not be aligned with the position where the third contact hole CH3_1 is to be formed, i.e., the second contact hole CH2.

If the second protective electrode 167 is not disposed on the end of the color filter layer 160, there may be damage to the color filter layer 160 during the process of forming the third contact hole CH3_1 in the fourth insulating layer 189. Even the portion of the color filter layer 160 that overlaps the region where the photolithography pattern PR is not formed may be etched, such that an inverted taper may be formed at the region. As a result, the pixel electrode 190 may be disconnected.

In contrast, according to the embodiment of the disclosure, the second protective electrode 167 is disposed on the color filter layer 160, and thus it may be possible to prevent damage to the color filter layer 160 during the process of forming the third contact hole CH3_1 in the fourth insulating layer 189. Since the second protective electrode 167 formed of the transparent conductive oxide may have a strong durability to dry etching, it may be rarely etched by the dry etching. Therefore, it may be possible to prevent the color filter layer 160 disposed under the second protective electrode 166 from being etched. Accordingly, it may be possible to prevent the pixel electrode 190_1 from being disconnected, thereby improving the reliability of the display device 1.

While the invention has been illustrated and described with reference to the embodiments thereof, it will be apparent to those of ordinary skill in the art that various changes in form and detail may be formed thereto without departing from the spirit and scope of the invention.

What is claimed is:

1. A display device comprising:
   a base;
   a semiconductor layer disposed on the base and comprising a source region, a drain region and a channel region;
   a first insulating layer disposed on the semiconductor layer;
   a gate line disposed on the first insulating layer, in a first direction and overlapping the channel region;
   a second insulating layer disposed on the gate line;
   a data line disposed on the second insulating layer, in a second direction intersecting the first direction, and in contact with a portion of the source region;
   a third insulating layer disposed on the data line;
   a drain electrode disposed on the third insulating layer and in contact with the drain region through a contact hole formed in the first insulating layer, the second insulating layer and the third insulating layer;
   a first protective electrode disposed on the drain electrode to overlap the drain electrode, the first protective electrode and the drain electrode have a same shape in a plan view;
   a fourth insulating layer disposed on the third insulating layer where the first protective electrode is formed; and
   a pixel electrode disposed on the fourth insulating layer and in contact with the first protective electrode through a contact hole formed in the fourth insulating layer.

2. The display device of claim 1, wherein the first protective electrode is made of a same material as the pixel electrode.

3. The display device of claim 2, wherein the first protective electrode is made of a transparent conductive material comprising at least one of indium tin oxide (ITO), indium zinc oxide (IZO), indium tin zinc oxide (ITZO) and aluminum zinc oxide (AZO).

4. The display device of claim 3, wherein the first protective electrode is in physical contact with the pixel electrode, and wherein the drain electrode is in electrical contact with the pixel electrode.

5. The display device of claim 3, wherein the first protective electrode is in electrical contact with the pixel electrode, and wherein the drain electrode is in electrical contact with the pixel electrode.

6. The display device of claim 4, wherein the drain electrode comprises triple layers of a Ti/Al/Ti in which titanium is stacked on and under aluminum.

7. The display device of claim 6, wherein the drain electrode and the first protective electrode do not overlap the data line in a third direction intersecting the first direction and the second direction.

8. The display device of claim 7, wherein the data line is in contact with the source region through another contact hole formed in the first insulating layer and the second insulating layer.

9. The display device of claim 8, further comprising a color filter layer disposed on the third insulating layer where the drain electrode and the first protective electrode are formed and not overlapping with the first contact hole, wherein the pixel electrode is disposed on the color filter layer.

10. The display device of claim 9, further comprising a second protective electrode disposed between the fourth insulating layer and the pixel electrode,
    wherein the second protective electrode is extended from an end of the color filter to a portion of the contact hole formed in the fourth insulating layer adjacent to the end of the color filter.

11. The display device of claim 10, wherein the second protective electrode is made of a same material as the first protective electrode.

12. The display device of claim 11, further comprising an organic layer disposed on the third insulating layer and the pixel electrode.

13. The display device of claim 12, wherein an upper surface of the organic layer is substantially coplanar with an upper surface of the pixel electrode.

14. The display device of claim 13, wherein the gate line is extended in the first direction and is bent in at least one direction to bypass the first protective electrode on a plane.

15. The display device of claim 14, wherein the gate line includes a first portion substantially in parallel with a first direction, a second portion substantially in parallel with the first direction and spaced apart from the first portion, and a third portion connecting the first portion with a second portion.

16. The display device of claim 14, further comprising:
    a light-blocking layer disposed on the base and overlapping the semiconductor layer; and
    a buffer layer disposed on the light-blocking layer, wherein the semiconductor layer is disposed on the buffer layer.

17. The display device of claim 16, wherein the base comprises a light-blocking area in which the light-blocking layer is disposed, and a light-transmitting area in which the light-blocking layer is not disposed.

18. A method of fabricating a display device comprising:
    forming a semiconductor layer comprising a source region, a drain region and a channel region on a base;
    forming a first insulating layer on the semiconductor layer;
    forming a gate line on the first insulating layer in a first direction, the gate line overlapping the channel region;
    forming a second insulating layer on the gate line;
    forming a data line on the second insulating layer in a second direction intersecting the first direction, the data line contacts a portion of the source region;

forming a third insulating layer on the data line;
forming a contact hole in the first insulating layer, the second insulating layer and the third insulating layer to expose the drain region;
forming a drain electrode on the third insulating layer, the drain electrode being in contact with the drain region exposed through the contact hole;
forming a first protective electrode on the drain electrode to overlap the drain electrode;
forming a fourth insulating layer on the third insulating layer where the first protective electrode is formed;
forming a contact hole in the fourth insulating layer to expose the first protective electrode; and
forming a pixel electrode on the fourth insulating layer, the pixel electrode contacting the first protective electrode exposed through the contact hole in the fourth insulating layer,
wherein the forming of the first protective electrode includes forming the first protective electrode and the drain electrode to have a same shape in a plan view.

19. The method of claim 18, wherein the first protective electrode is formed in a same photolithography process as the drain electrode.

20. The method of claim 19, wherein the first protective electrode is formed by wet etching, and the drain electrode is formed by dry etching.

21. The method of claim 20, further comprising forming a color filter not overlapping the contact hole in the first insulating layer, the second insulating layer and the third insulating layer, on the third insulating layer where the drain electrode and the first protective electrode are formed, wherein the pixel electrode is disposed on the color filter.

22. The method of claim 21, further comprising forming a second protective electrode between the fourth insulating layer and the pixel electrode, wherein the second protective electrode is disposed between an end of the color filter and the contact hole formed in the fourth insulating layer adjacent to the end of the color filter.

* * * * *